(12) United States Patent
Barton et al.

(10) Patent No.: US 12,375,130 B2
(45) Date of Patent: Jul. 29, 2025

(54) COORDINATED BEAMFORMING FROM CLIENT DEVICES

(71) Applicant: Cisco Technology, Inc., San Jose, CA (US)

(72) Inventors: Robert E. Barton, Richmond (CA); Jerome Henry, Pittsboro, NC (US); Matthew A. Silverman, Shaker Heights, OH (US); John M. Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 18/061,977

(22) Filed: Dec. 5, 2022

(65) Prior Publication Data
US 2024/0014859 A1     Jan. 11, 2024

Related U.S. Application Data

(60) Provisional application No. 63/367,947, filed on Jul. 8, 2022.

(51) Int. Cl.
*H04B 7/06* (2006.01)
*H04B 7/024* (2017.01)

(52) U.S. Cl.
CPC ........... *H04B 7/024* (2013.01); *H04B 7/0617* (2013.01)

(58) Field of Classification Search
CPC .... H04B 7/024; H04B 7/0617; H04B 7/0628; H04B 7/06956; H04B 7/0691; H04B 7/088; H04W 16/28; H01Q 1/246; H01Q 21/065; H01Q 3/40; H01Q 25/00; H01Q 21/061
See application file for complete search history.

(56) References Cited

U.S. PATENT DOCUMENTS

| | | | |
|---|---|---|---|
| 2015/0208431 A1* | 7/2015 | Chen | H04W 72/30 370/329 |
| 2016/0345277 A1 | 11/2016 | Segev | |
| 2019/0230524 A1 | 7/2019 | Aboul-Magd et al. | |
| 2020/0359299 A1 | 11/2020 | Suh et al. | |
| 2021/0385876 A1 | 12/2021 | Ahn et al. | |

(Continued)

FOREIGN PATENT DOCUMENTS

WO   2022079736 A1   4/2022

OTHER PUBLICATIONS

International Search Report and Written Opinion for International Application No. PCT/US2023/069002, mailed Sep. 28, 2023, 19 Pages.

(Continued)

*Primary Examiner* — Fred A Casca
(74) *Attorney, Agent, or Firm* — Patterson + Sheridan, LLP (57) ABSTRACT

Techniques for beamforming from wireless stations (STAs) are disclosed. These techniques include identifying a plurality of STAs for a beamforming group, for transmission to a wireless access point (AP). The techniques further include receiving, at the AP, first data transmitted from each of the plurality of STAs in the beamforming group to the AP at least partially at the same time, wherein the transmitting the first data from each of the plurality of STAs results in constructive interference between the transmissions from the plurality of STAs to the AP, and wherein the same first data is received from each of the plurality of STAs in the beamforming group.

17 Claims, 8 Drawing Sheets

(56) References Cited

U.S. PATENT DOCUMENTS

2022/0078634 A1   3/2022   Vermani et al.
2022/0225325 A1   7/2022   Alizadeh et al.

OTHER PUBLICATIONS

Mudumbai R., et al., "Distributed Transmit Beamforming: Challenges and Recent Progress", IEEE Communications Magazine, IEEE Service Center, Piscataway, US, Vol. 47, No. 2, Feb. 1, 2009, pp. 102-110, XP011280745, Abstract, p. 2, col. 1, p. 5 p. 3, col. 2—p. 4, col. 1.

* cited by examiner

COORDINATED BEAMFORMING FROM CLIENT DEVICES

CROSS-REFERENCE TO RELATED APPLICATIONS

This application claims benefit of U.S. provisional patent application Ser. No. 63/367,947 filed Jul. 8, 2022. The aforementioned related patent application is herein incorporated by reference in its entirety.

TECHNICAL FIELD

Embodiments presented in this disclosure generally relate to wireless communication. More specifically, embodiments disclosed herein relate to beamforming from client devices.

BACKGROUND

Beamforming can be an effective method to extend the transmission range from a wireless access point (AP) to a wireless station (STA) (e.g., a client device or another AP). To implement beamforming, an AP typically transmits its signal from different radio chains at a slightly different time, allowing constructive interference to focus the beam toward a target STA. Beamforming can greatly extend the range of the radio-frequency (RF) signal from the AP to the STA. However, beamforming today is employed on a single AP using multiple antennas and radio chains. This is because the signal transmitted from multiple antennas need to be timed precisely (e.g., with the right offset) to correctly focus the beam toward the client. Currently, distributed beamforming from multiple STAs with Wi-Fi is no done. However, there are many use cases where this would be helpful.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes identifying a plurality of wireless stations (STAs) for a beamforming group for transmission to a wireless access point (AP). The method further includes receiving at the AP first data transmitted from each of the plurality of STAs in the beamforming group to the AP at least partially at the same time. The transmitting the first data from each of the plurality of STAs results in constructive interference between the transmissions from the plurality of STAs to the AP, and the same first data is received from each of the plurality of STAs in the beamforming group.

Embodiments further include a processor and a memory having instructions stored thereon which, when executed on the processor, performs operations. The operations include identifying a plurality of STAs for a beamforming group for transmission to an AP. The operations further include receiving at the AP first data transmitted from each of the plurality of STAs in the beamforming group to the AP at least partially at the same time. The transmitting the first data from each of the plurality of STAs results in constructive interference between the transmissions from the plurality of STAs to the AP, and the same first data is received from each of the plurality of STAs in the beamforming group.

Embodiments further include a non-transitory computer-readable medium having instructions stored thereon which, when executed by a processor, performs operations. The operations include identifying a plurality of STAs for a beamforming group for transmission to an AP. The operations further include receiving at the AP first data transmitted from each of the plurality of STAs in the beamforming group to the AP at least partially at the same time. The transmitting the first data from each of the plurality of STAs results in constructive interference between the transmissions from the plurality of STAs to the AP, and the same first data is received from each of the plurality of STAs in the beamforming group.

Example Embodiments

As discussed above, distributed beamforming from multiple STAs is not done in current solutions. However, there are many use cases where this would be helpful. For example, consider the case of an Internet of Things (IoT) sensor field (e.g., for open mining, oil and gas production, agriculture, or any other suitable use). While an AP may be able to transmit an effective signal to the IoT devices, the difference in power budget between the AP and IoT device can result in many IoT devices, at the edge of the transmission area, having only marginal success in their transmission to the AP.

This issue can apply not only for IoT devices, but also for any STA which power is less than that of the AP. While the STA may hear the AP, the reverse is not always true. This intermittent connectivity at the edge results in retries and a poor or non-existent connection. For that reason, in large cells (especially for IoT), Wi-Fi is often overlooked as a technology choice in place of technologies like private 5G or long range wide area network (LoRaWAN). One or more techniques disclosed herein solve these problems by providing up-link (UL) beamforming from a group of remote STAs (e.g., to an AP).

For example, assume a group of remote Wi-Fi devices are situated at a range where their effective transmission to an AP is limited (at least at a useful Modulation Coding Scheme (MCS) or throughput level). This results in measurable retries, and poor connectivity. As discussed above, this could apply to remote devices in a large farm, a city, an oil field, or any other suitable location.

In an embodiment, to improve UL communication from the STAs to the AP, multiple STAs work together to act as a beamforming group. This can be accomplished using any of a number of suitable techniques. For example, STAs can first associate with an AP. This phase may occur through multiple retries, but it is expected to succeed, so that the STA is effectively in the Basic Service Set (BSS). Based on the AP signal to noise ratio (SNR) and received signal strength indication (RSSI), one or both of the STA and the AP recognizes that the AP is beyond range for efficient uplink transmission (e.g., the STA is an edge STA). At this point, an AP centric coordination mode can be used in which the AP coordinates beamforming groups among the STAs. This is discussed further, below, with regard to FIGS. 3-5. Alternatively, or in addition, an STA centric coordination mode can be used in which the STAs coordinate among themselves to form the beamforming group. This is discussed further, below, with regard to FIGS. 6-7. Both modes allow STAs to jointly transmit beamformed signals (e.g., transmit at the same time) so as to increase the amplitude of the received signal at the AP.

Figure 1:
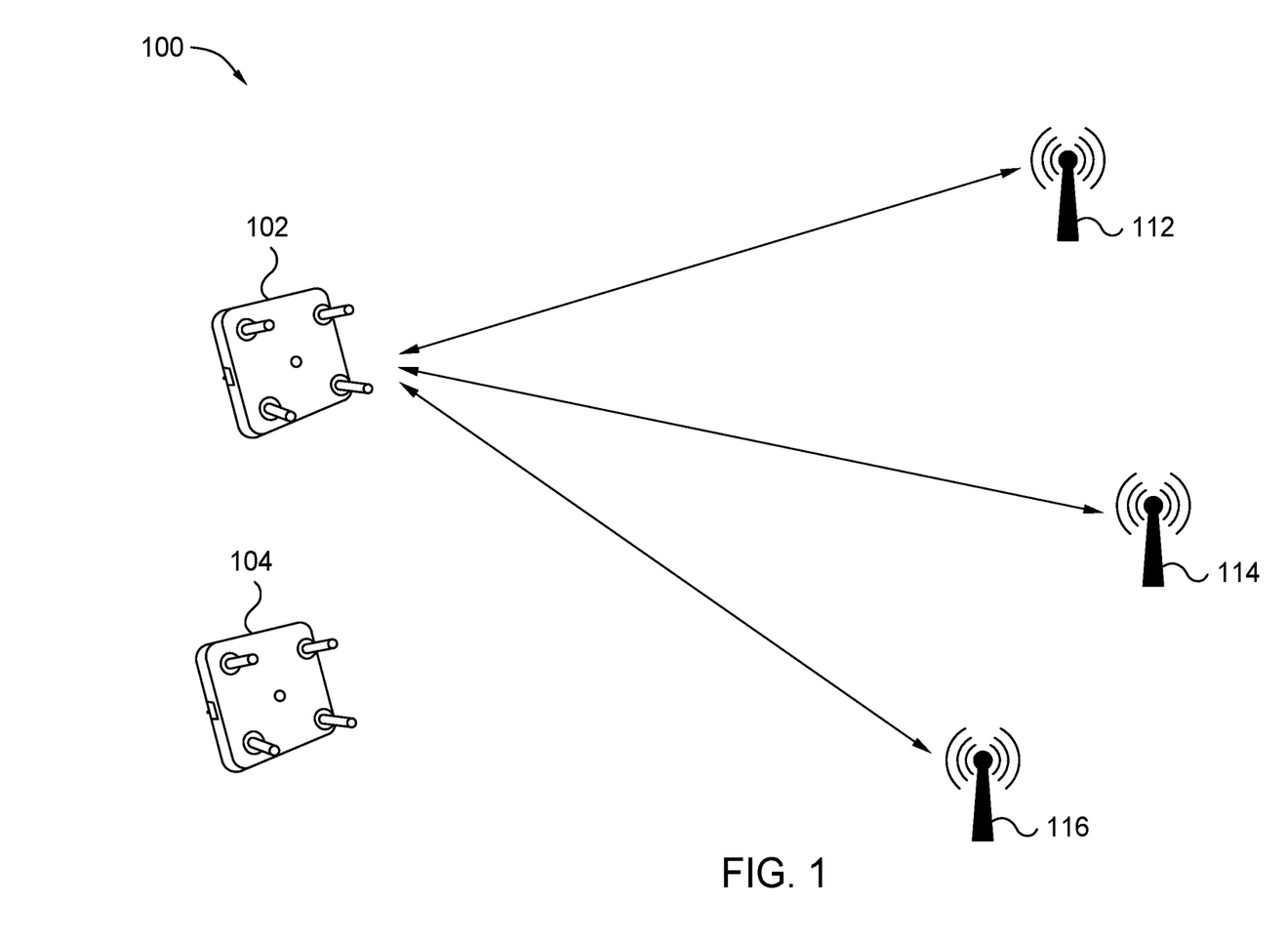
FIG. 1 illustrates a network environment for beamforming from client devices, according to one embodiment.

FIG. 1 illustrates a network environment 100 for beamforming from client devices, according to one embodiment. In an embodiment, the network environment 100 includes two APs 102 and 104, and three wireless stations 112, 114, and 116. For example, the three STAs 112, 114, and 116 are all associated with the AP 102. Each of the STAs 112, 114, and 116 receives downlink network transmissions from the AP 102, and transmits uplink transmissions to the AP 102.

In an embodiment, as discussed above, the STAs 112, 114, and 16 are remote Wi-Fi devices (e.g., relative to the AP 102) are situated at a range where their effective transmission to the AP 102 is limited. This results in poor connectivity. For example, the STAs 112, 114, and 116 could be remote devices in a large farm, a city, an oil field, or any other suitable location. This is merely an example, and the STAs 112, 114, and 116 can be any suitable wireless devices (e.g., any form of IoT device, smartphones, tablets, laptop computers, wearable devices, or any other suitable wireless devices) in any suitable location. Further, the STAs 112, 114, and 116 can have any suitable number of wireless antennas used for any suitable radio access technologies (e.g., multiple antennas used for WiFi and cellular connectivity).

In an embodiment, to improve UL communication from the STAs 112, 114, and 116 to the AP 102, these three STAs can work together and form a beamforming group. As discussed below in relation to FIGS. 3-7, this beamforming group can be coordinated by an AP (e.g., the AP 102), the STAs (e.g., one or more of the STAs 112, 114, and 116), any suitable combination of the AP 102 and the STAs 112, 114, and 116, or any other suitable device (e.g., a wireless local area network (WLAN) controller (WLC) or any other suitable network component). When formed in a beamforming group, the STAs 112, 114, and 116 can be coordinated to transmit a given data frame, together, in a manner to form constructive interference. This can increase the UL range and connectivity for the STAs 112, 114, and 116 to the AP 102.

Figure 2:
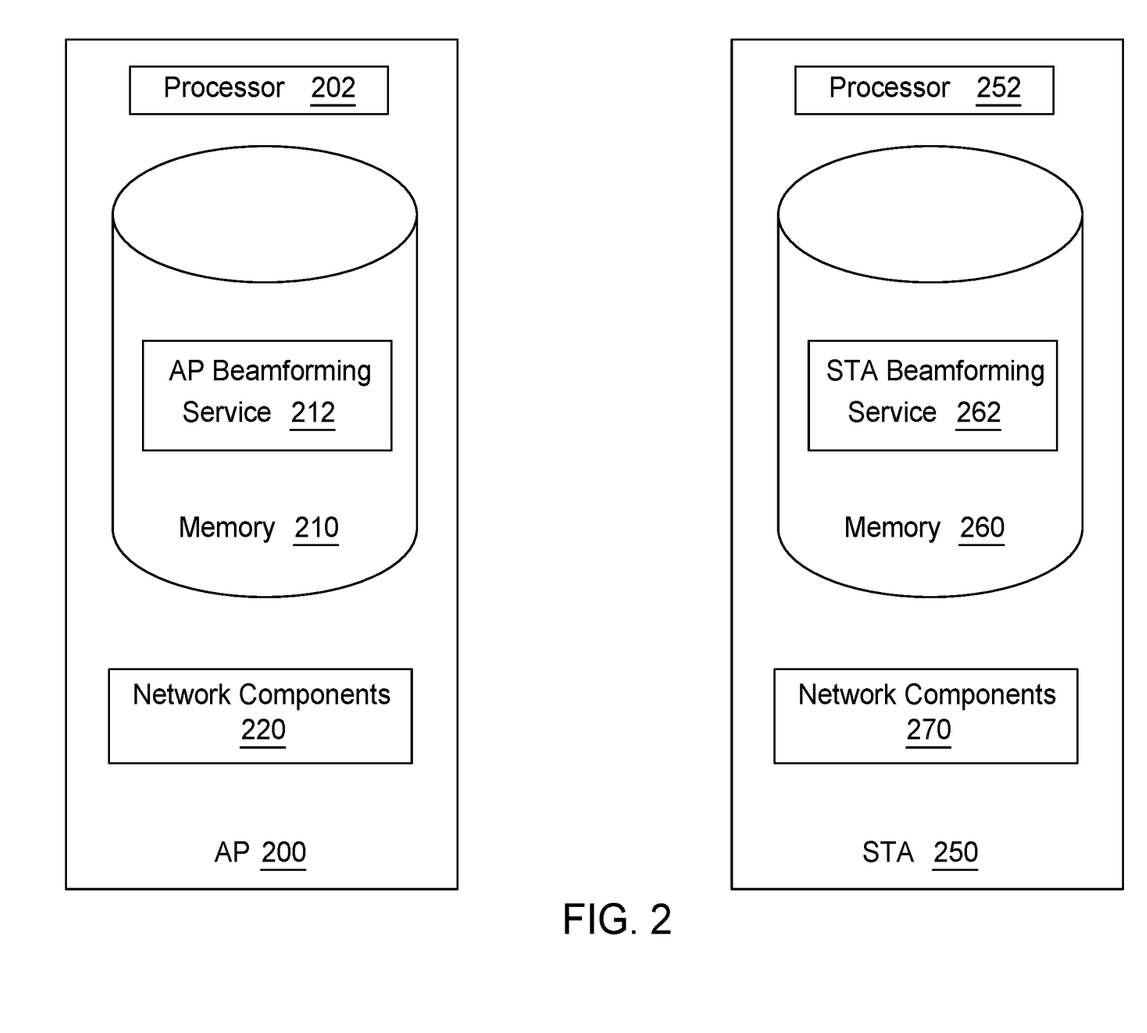
FIG. 2 is a block diagram illustrating an AP and an STA for beamforming from client devices, according to one embodiment.

FIG. 2 is a block diagram illustrating an AP 200 and an STA 250 for beamforming from client devices, according to one embodiment. In an embodiment, the AP 200 can correspond with either of the APs 102 and 104 illustrated in FIG. 1, and the STA 250 can correspond with any of the STAs 112, 114, and 116 illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the AP beamforming service 212 facilitates AP coordinated STA beamforming. This is discussed further, below, with regard to FIGS. 3-5. Further, using an AP 200 for coordinating STA beamforming is merely one example. Alternatively, or in addition, any other network device (e.g., a WLC or another network component) can be used.

The STA 250 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the STA 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the STA beamforming service 262 facilitates STA coordinated STA beamforming. This is discussed further, below, with regard to FIGS. 6-7. Further, using an STA 250 for coordinating STA beamforming is merely one example. Alternatively, or in addition, any other network device (e.g., the AP 200, a WLC or another network component, or any suitable combination) can be used.

Figure 3:
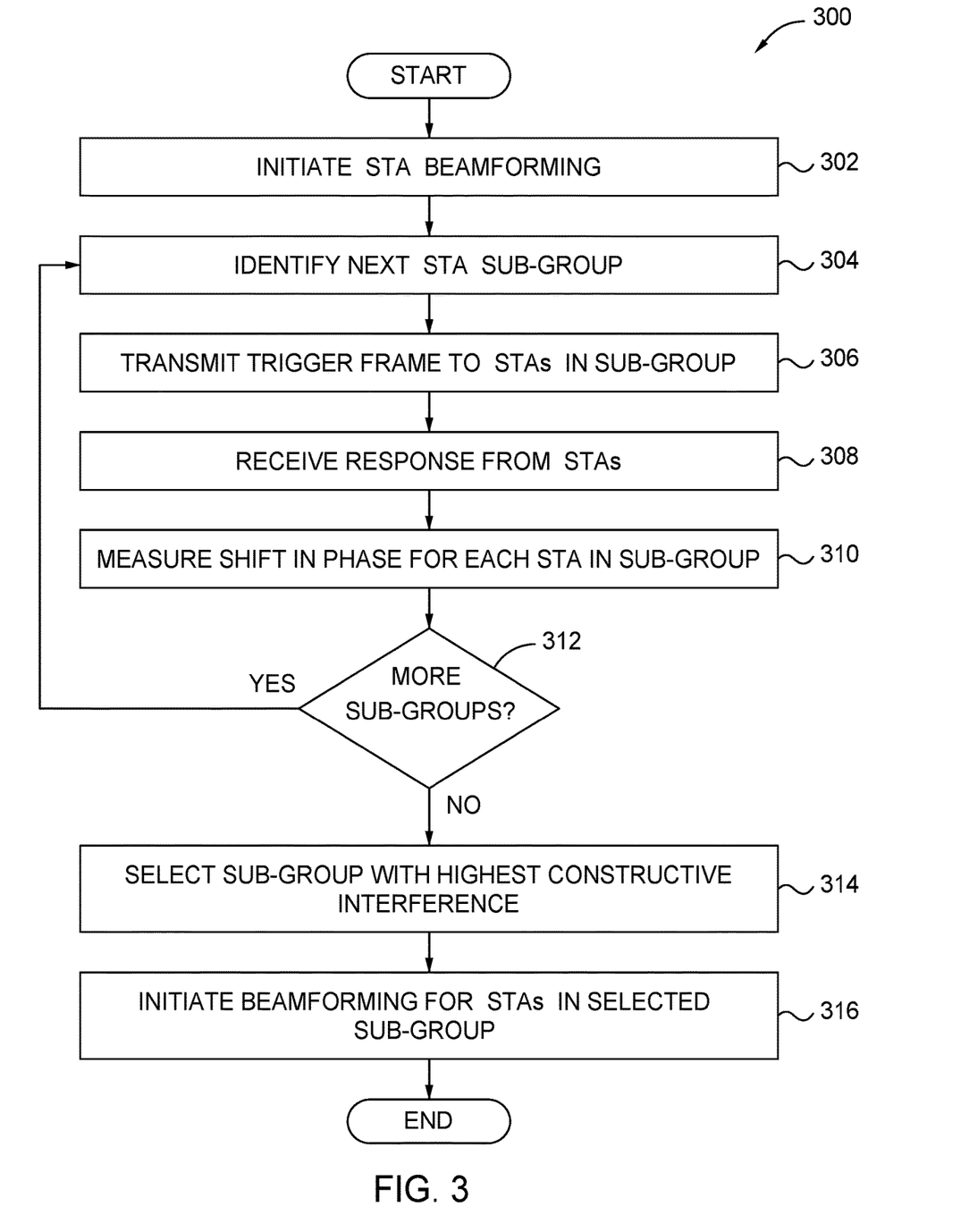
FIG. 3 is a flowchart illustrating AP coordinated beamforming from client devices, according to one embodiment.

FIG. 3 is a flowchart 300 illustrating AP coordinated beamforming from client devices, according to one embodiment. At block 302 an AP beamforming service (e.g., the AP beamforming service 212 illustrated in FIG. 2) initiates STA beamforming. In an embodiment, STAs (e.g., the STAs 112, 114, and 116 illustrated in FIG. 1) are able to associate with an AP (e.g., the AP 102 illustrated in FIG. 1), even though connectivity or throughput may be weak. For example, the STAs may be able to associate with an AP through multiple re-tries. This effectively includes the STAs in the basic service set (BSS) for the AP.

The AP beamforming service, however, can recognize that the STA, the AP, or both, are beyond range for efficient communication. For example, the AP beamforming service can use the AP signal SNR, RSSI, or any other suitable indication to identify that the range between the AP and STA indicates STA beamforming should be used. In an embodiment, the AP beamforming service can select AP coordinated beamforming and proceed to block 304. Alternatively, or in addition, the AP beamforming service can use a different AP coordinated beamforming technique (e.g., as illustrated below in relation to FIGS. 4-5), or can use STA coordinated beamforming (e.g., as illustrated below in relation to FIGS. 6-7).

Figure 4:
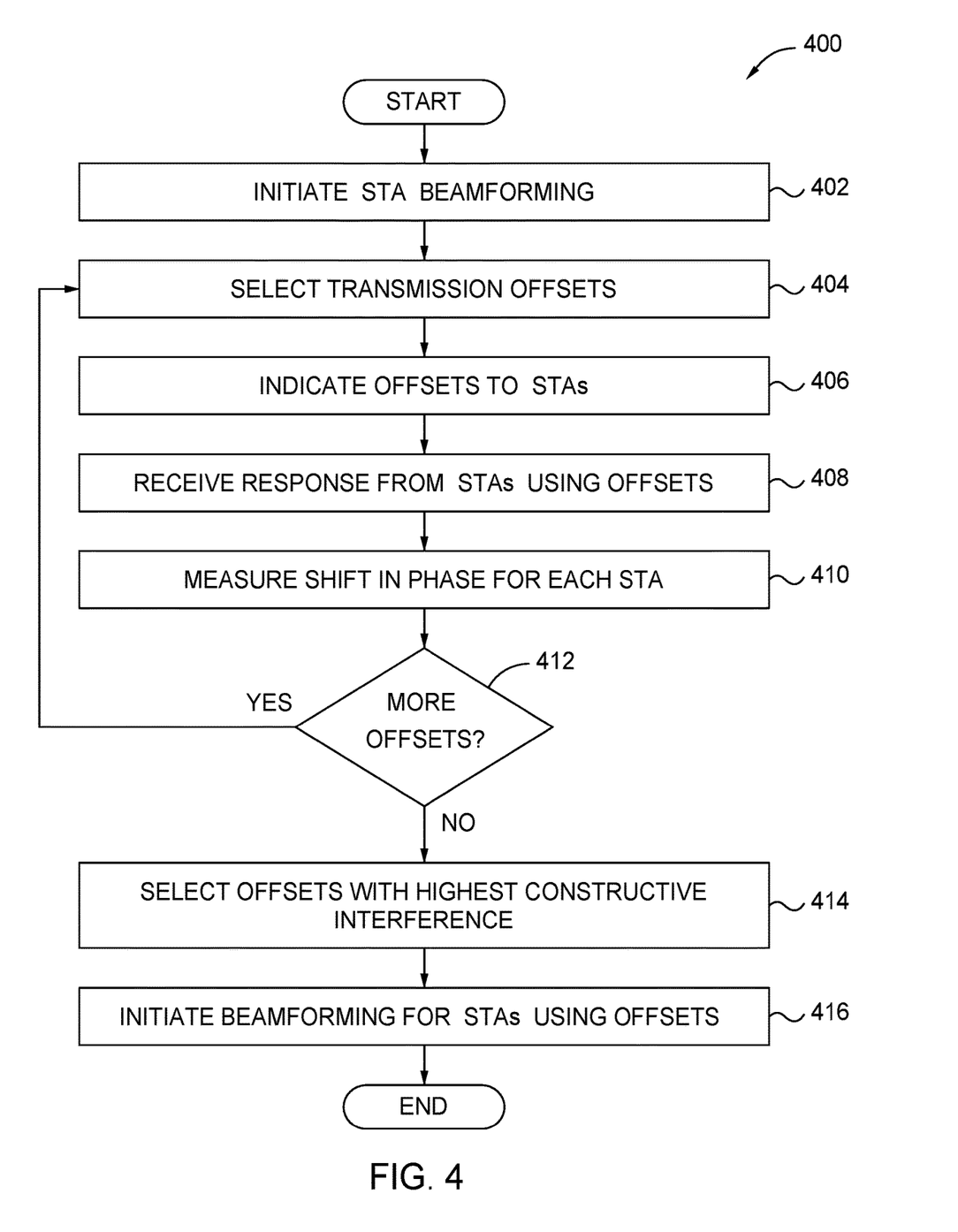
FIG. 4 is a flowchart further illustrating AP coordinated beamforming from client devices, according to one embodiment.
Figure 5:
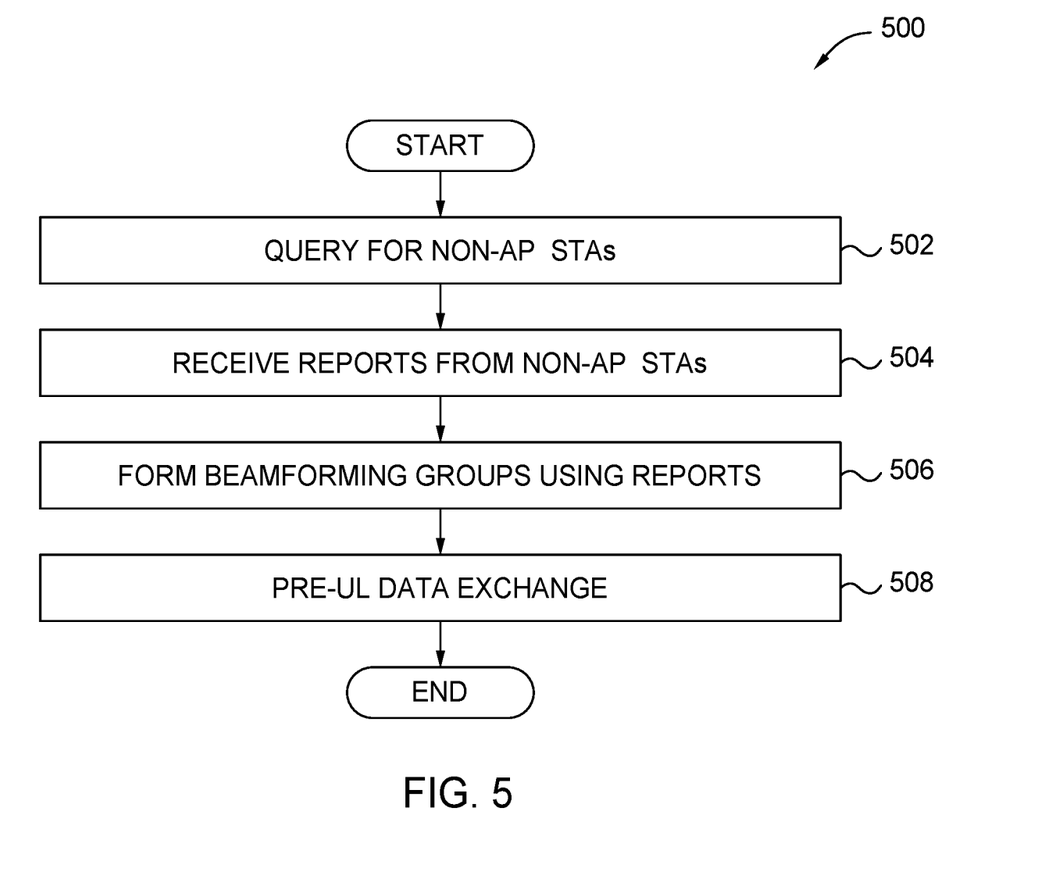
FIG. 5 is a flowchart also further illustrating AP coordinated beamforming from client devices, according to one embodiment.

While FIGS. 3-5 focus on AP coordinated beamforming, this is merely an example. In an embodiment, any suitable component or device (e.g., a controller or another network component) can coordinate STA beamforming. Further, as discussed below in relation to FIGS. 6-7, the STAs can themselves coordinate beamforming.

At block 304, the AP beamforming service identifies a next STA sub-group. In an embodiment, the AP beamforming service analyzes various sub-groups of STAs (e.g., of the STAs in the AP's BSS for which STA beamforming should be used) to identify sub-groups leading to the highest constructive interference for beamforming. As discussed further below, the AP beamforming service can iterate through possible sub-groups to identify the sub-group, or sub-groups, which should be used.

At block 306, the AP beamforming service transmits a trigger frame to the STAs in the sub-group. These trigger frames can be used as sounding frames to coordinate STA beamforming. For example, The AP can transmit a multi-user (MU) trigger frame to each of the STAs in the sub-group.

At block 308, the AP beamforming service receives a response from the STAs. For example, the AP beamforming service can receive an MU uplink frame from each of the STAs, with each STA having been allocated one or more resource units (RUs) in which to transmit a signal over the physical PHY layer. The STAs can transmit the MU uplink frame in response to receiving the trigger frame, using the allocated RUs.

At block 310, the AP beamforming service measures a shift in phase for each STA in the sub-group. For example, the AP beamforming service can measure a shift in phase between each STA in the respective allocated RU. In an embodiment, the AP beamforming service can use these measured shifts to calculate constructive interference among the STAs, to identify a proposed beamforming group among the STAs (e.g., using the allocated RUs).

At block 312, the AP beamforming service determines whether more sub-groups exist. For example, as discussed above in relation to block 304, the AP beamforming service can form sub-groups among STAs that are in both in the AP's BSS and for which STA beamforming is initiated. If additional sub-groups exist, the flow returns to block 304. If no additional sub-groups exist, the flow proceeds to block 314.

At block 314, the AP beamforming service selects a sub-group with the highest constructive interference. For example, the AP beamforming service can use the measured shift in phase at block 310, for each respective sub-group, to identify the sub-group with the highest constructive interference. The AP beamforming service can select this sub-group as the STA beamforming group.

At block 316, the AP beamforming service initiates beamforming for STAs in the selected sub-group. In an embodiment, the AP beamforming service transmits a network message to each STA in the sub-group indicating that beamforming should be used. The selected STAs can the use beamforming for UL communication with the AP.

A beamforming group is now formed and each participating STA has its own transmission schedule. In an embodiment, UL transmission may still follow the standard orthogonal frequency division multiple access (OFDMA) mechanism, where STAs advertise their UL queue requirements through a solicited buffer status report (BSR) or unsolicited BSR. However, in this case, the STAs respond to the AP as a group.

Because the group transmits as a cohesive group in a beam, they send an exact replica of the frames. Thus, each STA in the group has an aggregate copy of the data to be sent to the AP. To accomplish this, in one embodiment, the STAs perform pre-UL data exchange. For example, the STAs can locally share their UL data to the group (e.g., using a local peer-to-peer (P2P) frame, neighborhood aware networking (NAN), or any other suitable local transmission technique. In an embodiment, this turn aggregates the data and builds the overall frame for the next UL transmission. One or more of the STAs (e.g., an STA elected as a primary clock device, as discussed further below in relation to FIG. 6) then shares this aggregate UL frame with the other local devices in the group. At this point, all devices in the beamforming group have an exact replica of the data that will be transmitted when a trigger frame arrives.

When the AP solicits a BSR from any STA in the group, the STA responds with the aggregate UL transmission needs of the entire group, not just itself, and immediately assumes the role of the primary clock device (communicating this update locally to the other members of the group). After the BSR is sent, the AP expects only the target STA to respond when the trigger frame is sent, however, in reality the UL may be from all the STAs in the group responding in unison, all sending an exact replicas of the frame, with their transmission schedules aligned in a manner that forms a beam capable of reaching the AP.

When the AP sends its Multi User Request to Send (MU RTS) frame to the target STA, it assigns a certain resource unit (RU) for the transmission, which is similarly communicated with other members of the beamforming group. When the trigger frame arrives, the entire group responds using the target STA media access control (MAC) address as the source address and using the offset timing schedule assigned to each member for the transmission. Thus, each STA transmits in deterministic offset way after the trigger frame arrives allowing the beam to be focused. In an embodiment, it can be assumed that all STAs in the local group hear the trigger frame at the same moment.

If the UL transmission was successful, the AP acknowledges the transmission. Because the AP knows the transmission came from a STA beamforming group, the AP may also communicate back to the primary clock device, informing it of the level of success. If the UL transmission was not entirely successful, the primary clock device and AP may continue to adjust the timing schedule of each STA to improve the beam. Over time, the AP will respond to the changes and inform the primary clock device of improvements which will assist in optimizing the beam.

In many contexts with out of range STAs (e.g., for fixed IoT devices) it is expected that STAs will often not be mobile. This means that the selected beamforming groups will likely not need to change frequently. But channel conditions may change over time, or the STAs may actually be mobile, and the groups will need to be re-built at intervals. In an embodiment, the re-grouping interval can be set by default, configured by an administrator (e.g., using a suitable user interface), identified using machine learning (ML) or another suitable automated technique, or identifies using any other suitable technique.

FIG. 4 is a flowchart 400 further illustrating AP coordinated beamforming from client devices, according to one embodiment. At block 402 an AP beamforming service (e.g., the AP beamforming service 212 illustrated in FIG. 2) initiates STA beamforming. Just as discussed above in relation to block 302 illustrated in FIG. 3, in an embodiment STAs may be included in the BSS for an AP but have poor UL connectivity such that beamforming should be used. In an embodiment, the AP beamforming service initiates beamforming for these STAs.

At block 404, the AP beamforming service selects transmission offsets. In an embodiment, in FIG. 3 the AP beamforming service iterates through sub-groups of STAs using their assigned RUs for transmission to identify a preferred sub-group with the highest constructive interference for STA beamforming. At block 404, the AP beamforming service iterates through a single group of STAs using varying transmission offsets. The AP beamforming service can identify the offsets leading to the highest constructive interference, and use those offsets for the STA beamforming.

At block 406, the AP beamforming service indicates the offsets to the STAs. For example, the AP beamforming service can transmit an MU trigger frame (or any other suitable network message) to each of the STAs indicating offsets to be used for UL transmission from each respective STA to the AP. The offset can be, for example, a time offset beyond the STAs otherwise allocated transmission time.

At block 408, the AP beamforming service receives a response from the STAs using the offsets. For example, the AP beamforming service can receive an MU uplink frame from each of the STAs, with each STA transmitting the MU uplink frame at a time taking into account the offset provided by the AP (e.g., an offset after receiving the trigger frame from the AP).

At block 410, the AP beamforming service measures a shift in phase for each STA. For example, the AP beamforming service can measure a shift in phase between each STA transmitting using the allocated offset. In an embodiment, the AP beamforming service can use these measured shifts to calculate constructive interference among the STAs, to identify a proposed beamforming group among the STAs (e.g., using the allocated offsets).

At block 412, the AP beamforming service determines whether more offsets should be used. In an embodiment, the AP beamforming service can select a set of offset values to use to identify the beamforming group. For example, the AP beamforming service can allocate an offset to each STA in the group of STA for which beamforming has been initiated. The AP beamforming service can iterate through multiple groups of these allocated offsets, to identify the preferred offset to allocate to each respective STA. If additional offset values exist within this selected set of offsets, the flow returns to block 402. If not, the flow proceeds to block 414.

At block 414, the AP beamforming service selects the offsets with the highest constructive interference. For example, the AP beamforming service can use the measured shift in phase at block 310, for each respective collection of offsets, to identify the collection of offsets with the highest constructive interference. The AP beamforming service can select this collection of offsets to use with the STA beamforming group.

At block 416, the AP beamforming service initiates beamforming for STAs using the selected offsets. In an embodiment, the AP beamforming service transmits a network message to each STA in the sub-group indicating that beamforming should be used. As discussed above in relation to block 316 illustrated in FIG. 3, the selected STAs can the use beamforming for UL communication with the AP. In an embodiment, when UL communication occurs from any of the STAs in the beamforming group, each of the STAs in the group transmits the same data (e.g., the same data frame) using their respective allocated offsets. This creates constructive interference and improves the UL communication.

FIG. 5 is a flowchart 500 also further illustrating AP coordinated beamforming from client devices, according to one embodiment. At block 502 an AP beamforming service (e.g., the AP beamforming service 212 illustrated in FIG. 2) queries for non-AP STAs. In an embodiment, as an alternative to the techniques illustrated in FIGS. 3-4, the AP beamforming service queries each STA in the AP's BSS for what other non-AP STAs the respective STA is near. For example, looking at FIG. 1, assume the STA 114 is in the BSS for the AP 102, while the STAs 112 and 116 are not in the BSS for the AP 102. The AP 102 can query the STA 114 for what other non-AP STAs the STA 114 is near (e.g., the STAs 112 and 116).

At block 504, the AP beamforming service receives reports from the non-AP STAs. In an embodiment, the AP beamforming service receives reports from each STA identified at block 502. Alternatively, the AP beamforming service receives reports from a subset of the STAs identified at block 502. These reports can, for example, identify what other STAs are near the respective reporting STA (e.g., which other non-AP STAs the reporting STA is able to hear).

At block 506, the AP beamforming service forms beamforming groups using the reports (e.g., the reports received at block 504). For example, the AP beamforming service can define beamforming groups similarly to the techniques used to form multi-user multiple input multiple output (MU-MIMO) groups. As another example, the AP beamforming service can announce groupings in a trigger frame.

At block 508, the STAs in the beamforming group perform pre-UL data exchange. In an embodiment, STAs that are in a beamforming group together exchange data that is used for the next uplink ahead of time. While this is explained in relation to FIG. 5, this is merely an example, and pre-UL data exchange can be used with beamforming groups formed using any of the techniques illustrated in FIGS. 3-7.

In an embodiment, payloads at the MAC protocol data unit (MPDU)-level are exchanged between STAs in a beamforming group, as well as information scrambler information. This can be done with a trigger that allows for intergroup exchange prior to the UL or could happen autonomously between STAs based on P2P messaging. Each STA may have a beamforming status report it can report for the group based on this exchange.

In one embodiment, for status report and sounding, the AP beamforming service polls a beamforming group to determine if there is data. The UL group treats the poll as a trigger, and sends a beamforming status report for the UL group.

In one embodiment, the AP beamforming service performs sounding by sending a MU Null Data Physical Protocol Data Unit (NDP) or NDP Announcement (NDPA) to the beamforming group. The beamforming group feeds back the MU compressed steering matrix (cSM). The AP sends back a combined cSM for the UL group.

In one embodiment, to perform coordinated UL beamforming, when the AP sends an UL trigger frame, it assigns a beamforming group to a particular set of RUs (or more typically, the whole BW and MU-MIMO only UL). The individual STAs acquire the Channel Frequency Offset (CFO) (i.e., the center frequency of the channel that the STAs use to align their receiver) from the trigger frame to reduce their CFO error between each other and clock offset from the start of the trigger frame.

In one embodiment, STAs send the same physical layer protocol data unit (PPDU) at the same time with the fedback full cSM. In one embodiment, for regular beamforming, phase error is more tolerable (up to 20 degrees can still preserve the beamforming gain for low-numbers of Tx paths). Therefore, the CFO and time offset do not have to be perfect (for example +/−2 Hz and +/−100 ns is acceptable as it leads to 17 degrees of max error in 5 GHz for a 50 us PPDU). In one embodiment, coordinated vs Unicast is considered. The AP determines whether to trigger a group UL or single user (SU) uplink based on the MCS for SU vs group UL and the expected duration of the PPDU.

Figure 6:
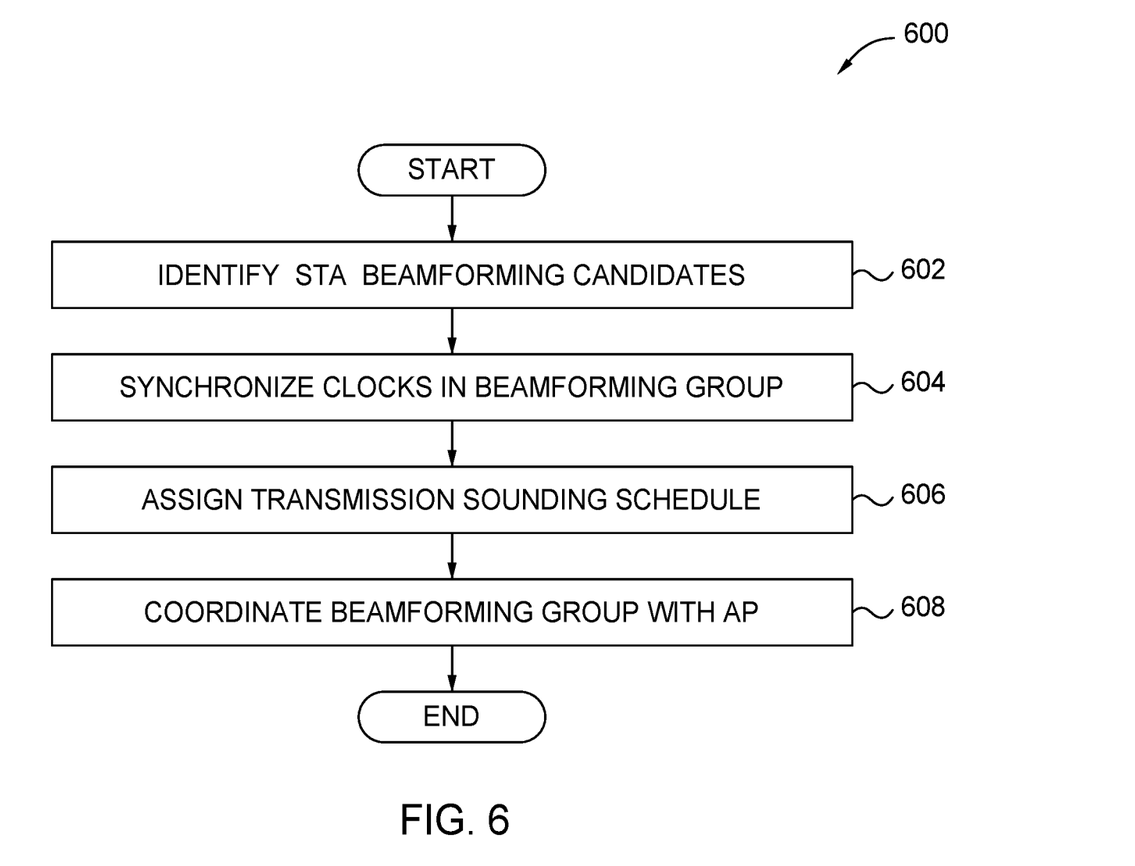
FIG. 6 is a flowchart illustrating STA coordinated beamforming from client devices, according to one embodiment.

FIG. 6 is a flowchart 600 illustrating STA coordinated beamforming from client devices, according to one embodiment. At block 602, an STA beamforming service (e.g., the STA beamforming service 262 illustrated in FIG. 2) identifies STA beamforming candidates. In an embodiment, the STA beamforming service identifies nearby STAs that are part of the same WLAN and would like to join the beamforming group. For example, the STA beamforming service can transmit a local sounding frame to nearby STAs, soliciting a response from any nearby STA that is part of the same WLAN. In an embodiment, responding STAs are typically other STAs with the same connectivity problem (e.g., the same SNR problem) that prevents UL connectivity to an AP.

In an embodiment, if at least one other STA responds, the two STAs will attempt to form a beamforming group. The beamforming group can include any suitable number of STAs, and acts like a local cluster. For example, none of the STAs in the cluster has the range to effectively transmit to the AP (i.e. their SNR is too high, and none of them are close enough to be repeaters), but as a group their beam is intended to allow effective UL communications.

At block 604, the STA beamforming service synchronizes clocks in the beamforming group. In an embodiment, when a group of STAs agree to form a beamforming group, the STAs in the group synchronize their clocks (e.g., to facilitate synchronized transmission time offsets for beamforming). For example, an STA beamforming service can elect a primary clock device for the group. This primary clock device can then use its clock as a reference for the others in the beamforming group.

In an embodiment, this can be done using any suitable technique. For example, IEEE 1588 time protocol (PTP) steps can be used, including frequency offset sync, transit delay, and reference clock set. These are merely examples, and any suitable techniques can be used.

At block 606, the STA beamforming service assigns a transmission sounding schedule. In an embodiment, with the clocks correctly aligned, the primary clock device must now assign a transmission sounding schedule for the beamforming group, configuring a slight, but deterministic, timing offset for each STA. This allows the group of STAs to form a focused beam targeting the AP. The offset is essentially a deterministic and individual delay in transmission each STA must observe. The primary clock device then sends a sounding request to the AP. Upon AP response and acceptance (e.g., acting as a trigger frame), all STAs in the beamforming group transmit a coordinated sounding frame as per their allocated schedule. The AP returns to the primary clock device the feedback matrix. The primary clock device modifies the schedule of individual members of the beamforming group, and the operation repeats. The group then finds the best schedule for each member.

At block 608, the STA beamforming service coordinates the beamforming group with the AP. For example, as discussed above in relation to FIG. 3, because the group will transmit as a cohesive group in a beam, they must send an exact replica of the frames. The STA beamforming service must coordinate this transmission with the AP. For example, as discussed above in relation to FIG. 3, when the AP solicits a BSR from any STA in the group, the STA responds with the aggregate UL transmission needs of the entire group, not just itself, and immediately assumes the role of the primary clock device (communicating this update locally to the other members of the group).

When the AP sends its Multi User Request to Send (MU RTS) frame to the target STA, it assigns a certain resource unit (RU) for the transmission, which is similarly communicated with other members of the beamforming group. When the trigger frame arrives, the entire group responds using the target STA media access control (MAC) address as the source address and using the offset timing schedule assigned to each member for the transmission. If the UL transmission was successful, the AP acknowledges the transmission. Because the AP knows the transmission came from a STA beamforming group, the AP may also communicate back to the primary clock device, informing it of the level of success. If the UL transmission was not entirely successful, the primary clock device and AP may continue to adjust the timing schedule of each STA to improve the beam. Over time, the AP will respond to the changes and inform the primary clock device of improvements which will assist in optimizing the beam.

Figure 7:
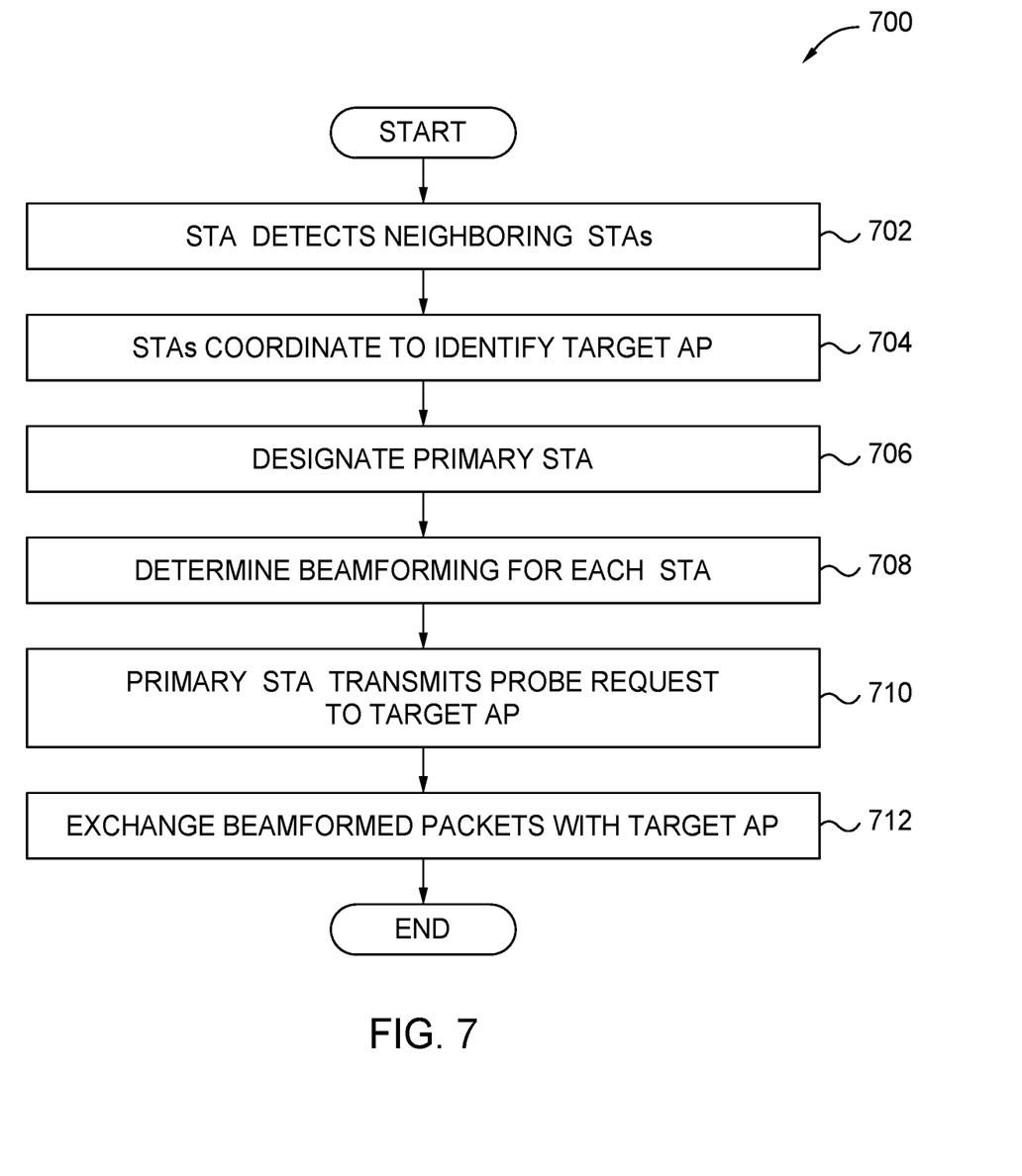
FIG. 7 is a flowchart further illustrating STA coordinated beamforming from client devices, according to one embodiment.

FIG. 7 is a flowchart 700 further illustrating STA coordinated beamforming from client devices, according to one embodiment. At block 702, an STA beamforming service (e.g., the STA beamforming service 262 illustrated in FIG. 2) detects neighboring STAs. For example, each STA can use an STA beamforming service to detect other STAs over time and determines whether the other STAs are within range to become a beamforming group.

At block 704, the STA beamforming service coordinates to identify a target AP. In an embodiment, each STA can identify candidate APs. The STAs can then coordinate to select the target AP.

At block 706, the STA beamforming service designates a primary STA. In an embodiment, the STAs coordinate and designate a primary STA for the beamforming group.

At block 708, the STA beamforming service determines beamforming for each STA. In an embodiment, each STA observes the beacon of the designated AP and determines beamforming based on a channel estimate. This is merely an example.

At block 710, the STA beamforming service for the primary STA transmits a probe request to the target AP. For example, the primary STA can transmit a probe request to the AP to signify that the beamforming group will transmit a joint UL at the next opportunity (e.g., the next triggered UL opportunity).

At block 712, the STA beamforming service exchanges beamformed packets with the target AP. In an embodiment, at the next trigger frame with available RUs, the STAs send an independently beamformed but joint packet (e.g., the same data is transmitted, and beamforming occurs within each individual device) with a probe request with a field that indicates it is a joint beamforming group. The AP responds with an ACK and a probe response that has a field that gives the beamforming group a beamforming group ID. For example, the beamforming group ID can be similar to MU group identifies in 802.11ac. The beamforming group then does a joint independently beamformed ACK, and similar back and forth goes on to fully authenticate and associate the STAs with the AP.

In an embodiment, for data traffic the AP intermittently does downlink sounding (e.g., neighbor discovery protocol sounding) to client devices. The client devices suppress feedback, and uses the sounding for implicitly sounding the channel for later uplinks. Further, in an embodiment the MPDUs are shared amongst STAs. The AP triggers the beamforming group to transmit, and the STAs transmit the same packet and independently beamform the PPDU.

Figure 8:
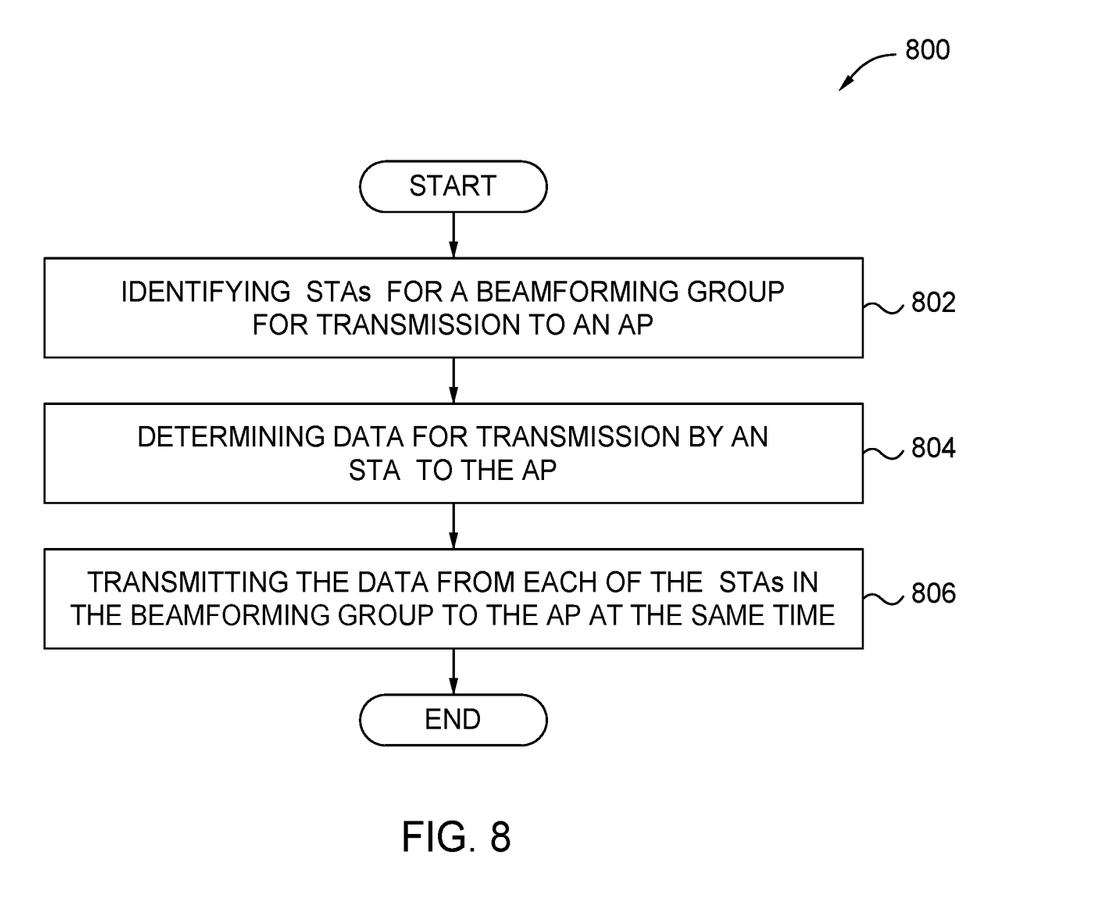
FIG. 8 is a flowchart further illustrating beamforming from STAs to an AP, according to one embodiment.

FIG. 8 is a flowchart 800 further illustrating beamforming from STAs to an AP, according to one embodiment. At block 802, a beamforming service (e.g., one or both of the AP beamforming service 212 and the STA beamforming service 262 illustrated in FIG. 2) identifies STAs for a beamforming group for transmission to an AP. As discussed above in relation to FIGS. 3-5, in one embodiment, the AP can coordinate identifying STA beamforming candidates. Alternatively, or in addition, as discussed above in relation to FIGS. 6-7, an STA can coordinate identifying STA beamforming candidates.

At block 804, the beamforming service determines data for transmission by an STA to the AP. As discussed above in relation to FIGS. 3-7, in an embodiment the beamforming can transmit the same data, from multiple STAs, to an AP to create constructive interference. In an embodiment, the beamforming service identifies the data for transmission (e.g., to share the data among the STAs, prior to UL from the STAs to the AP).

At block 806, the beamforming service transmits data from each of the STAs in the beamforming group to the AP at the same time. In an embodiment, this creates constructive interference. For example, the various STAs may transmit at a slight timing offset to create constructive interference between transmissions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    identifying a plurality of wireless stations (STAs) for a beamforming group for transmission to a wireless access point (AP);
    transmitting, from the AP to each of the plurality of STAs, one or more network messages;
    receiving, at the AP, a response from each of the plurality of STAs;
    selecting the plurality of STAs for the beamforming group based on measuring a shift in phase in transmission from each respective STA of the plurality of STAs to the AP using the received responses; and
    receiving at the AP first data transmitted from each of the plurality of STAs in the beamforming group to the AP at least partially at a same time,
    wherein the transmitting the first data from each of the plurality of STAs results in constructive interference between the transmissions from the plurality of STAs to the AP, and
    wherein the same first data is received from each of the plurality of STAs in the beamforming group.

2. The method of claim 1, further comprising:
    transmitting, from the AP to each of a second plurality of STAs, a second one or more network messages;
    receiving, at the AP, a response from each of the second plurality of STAs; and
    determining that the second plurality of STAs results in less constructive interference compared with the plurality of STAs, based on measuring a shift in phase in transmission from each respective STA of the second plurality of STAs to the AP using the received responses from each of the second plurality of STAs.

3. The method of claim 1, further comprising:
    determining a plurality of transmission offsets for the plurality of STAs, based on estimated constructive interference for transmission from the plurality of STAs to the AP; and
    transmitting the first data from each of the plurality of STAs in the beamforming group to the AP at least partially at the same time using the plurality of transmission offsets.

4. The method of claim 3, wherein determining a plurality of transmission offsets for the plurality of STAs comprises:
    selecting the plurality of transmission offsets, from among a plurality of sets of candidate transmission offsets, based on measuring a phase shift from transmission by each of the plurality of STAs to the AP using each of the respective plurality of sets of candidate transmission offsets.

5. The method of claim 1, wherein identifying the plurality of STAs for the beamforming group is based on receiving one or more reports, at the AP, from the plurality of STAs.

6. The method of claim 1, further comprising:
    identifying, at a first STA of the plurality of STAs, the plurality of STAs for the beamforming group;
    synchronizing clocks between the plurality of STAs for the beamforming group; and
        assigning a transmission sounding schedule, by at least one of the STAs in the beamforming group, for the plurality of STAs in the beamforming group, the transmission sounding schedule comprising a plurality of transmission offsets,
    wherein the transmitting the first data from each of the plurality of STAs in the beamforming group to the AP at least partially at the same time uses the transmission sounding scheduling.

7. The method of claim 6, wherein synchronizing clocks between the plurality of STAs for the beamforming group comprises:
    electing a primary clock STA among the plurality of STAs in the beamforming group; and
    synchronizing clocks between the plurality of STAs for the beamforming group using the primary clock STA as a reference clock.

8. The method of claim 1, further comprising:
    determining beamforming for a first STA in the beamforming group based on the first STA receiving a network transmission communicated between the AP and another STA in the beamforming group.

9. The method of claim 1, wherein transmitting the first data from each of the plurality of STAs in the beamforming group to the AP at least partially at the same time further comprises:
    identifying the first data for communication to the AP; and
    transmitting the first data among at least some of the plurality of STAs in the beamforming group prior to transmitting the first data to the AP from each of the plurality of STAs in the beamforming group.

10. A system, comprising:
a processor; and
a memory having instructions stored thereon which, when executed on the processor, performs operations comprising:
identifying a plurality of wireless stations (STAs) for a beamforming group for transmission to a wireless access point (AP);
transmitting, from the AP to each of the plurality of STAs, one or more network messages;
receiving, at the AP, a response from each of the plurality of STAs;
selecting the plurality of STAs for the beamforming group based on measuring a shift in phase in transmission from each respective STA of the plurality of STAs to the AP using the received responses; and
receiving at the AP first data transmitted from each of the plurality of STAs in the beamforming group to the AP at least partially at a same time,
wherein the transmitting the first data from each of the plurality of STAs results in constructive interference between the transmissions from the plurality of STAs to the AP, and
wherein the same first data is received from each of the plurality of STAs in the beamforming group.

11. The system of claim 10, the operations further comprising:
transmitting, from the AP to each of a second plurality of STAs, a second one or more network messages;
receiving, at the AP, a response from each of the second plurality of STAs; and
determining that the second plurality of STAs results in less constructive interference compared with the plurality of STAs, based on measuring a shift in phase in transmission from each respective STA of the second plurality of STAs to the AP using the received responses from each of the second plurality of STAs.

12. The system of claim 10, the operations further comprising:
determining a plurality of transmission offsets for the plurality of STAs, based on estimated constructive interference for transmission from the plurality of STAs to the AP; and
transmitting the first data from each of the plurality of STAs in the beamforming group to the AP at least partially at the same time using the plurality of transmission offsets.

13. The system of claim 10, the operations further comprising:
identifying, at a first STA of the plurality of STAs, the plurality of STAs for the beamforming group;
synchronizing clocks between the plurality of STAs for the beamforming group; and
assigning a transmission sounding schedule, by at least one of the STAs in the beamforming group, for the plurality of STAs in the beamforming group, the transmission sounding schedule comprising a plurality of transmission offsets,
wherein the transmitting the first data from each of the plurality of STAs in the beamforming group to the AP at least partially at the same time uses the transmission sounding scheduling.

14. A non-transitory computer-readable medium having instructions stored thereon which, when executed by a processor, performs operations comprising:
identifying a plurality of wireless stations (STAs) for a beamforming group for transmission to a wireless access point (AP);
transmitting, from the AP to each of the plurality of STAs, one or more network messages;
receiving, at the AP, a response from each of the plurality of STAs;
selecting the plurality of STAs for the beamforming group based on measuring a shift in phase in transmission from each respective STA of the plurality of STAs to the AP using the received responses; and
receiving at the AP first data transmitted from each of the plurality of STAs in the beamforming group to the AP at least partially at a same time,
wherein the transmitting the first data from each of the plurality of STAs results in constructive interference between the transmissions from the plurality of STAs to the AP, and
wherein the same first data is received from each of the plurality of STAs in the beamforming group.

15. The non-transitory computer-readable medium of claim 14, the operations further comprising:
transmitting, from the AP to each of a second plurality of STAs, a second one or more network messages;
receiving, at the AP, a response from each of the second plurality of STAs; and
determining that the second plurality of STAs results in less constructive interference compared with the plurality of STAs, based on measuring a shift in phase in transmission from each respective STA of the second plurality of STAs to the AP using the received responses from each of the second plurality of STAs.

16. The non-transitory computer-readable medium of claim 14, the operations further comprising:
determining a plurality of transmission offsets for the plurality of STAs, based on estimated constructive interference for transmission from the plurality of STAs to the AP; and
transmitting the first data from each of the plurality of STAs in the beamforming group to the AP at least partially at the same time using the plurality of transmission offsets.

17. The non-transitory computer-readable medium of claim 14, the operations further comprising:
identifying, at a first STA of the plurality of STAs, the plurality of STAs for the beamforming group;
synchronizing clocks between the plurality of STAs for the beamforming group; and
assigning a transmission sounding schedule, by at least one of the STAs in the beamforming group, for the plurality of STAs in the beamforming group, the transmission sounding schedule comprising a plurality of transmission offsets,
wherein the transmitting the first data from each of the plurality of STAs in the beamforming group to the AP at least partially at the same time uses the transmission sounding scheduling.

* * * * *